(12) United States Patent
Hagen et al.

(10) Patent No.: US 7,938,404 B2
(45) Date of Patent: May 10, 2011

(54) SLIDE RING SEAL

(75) Inventors: Klaus Hagen, Hof (DE); Volker Netsch, Landshut (DE); Bernd Huster, Münchberg (DE)

(73) Assignee: Wilo AG, Dortmund (DE)

( * ) Notice: Subject to any disclaimer, the term of this patent is extended or adjusted under 35 U.S.C. 154(b) by 382 days.

(21) Appl. No.: 11/989,618

(22) PCT Filed: Jul. 24, 2006

(86) PCT No.: PCT/EP2006/007253
§ 371 (c)(1),
(2), (4) Date: Mar. 3, 2008

(87) PCT Pub. No.: WO2007/014666
PCT Pub. Date: Feb. 8, 2007

(65) Prior Publication Data
US 2009/0026710 A1 Jan. 29, 2009

(30) Foreign Application Priority Data
Jul. 29, 2005 (DE) .......... 10 2005 036 338

(51) Int. Cl.
*F16J 15/34* (2006.01)
*F16J 15/40* (2006.01)
*F01D 11/04* (2006.01)

(52) U.S. Cl. ........ 277/369; 277/372; 277/408; 277/431; 277/432

(58) Field of Classification Search .......... 277/317–320, 277/358, 369, 370–373, 408, 431–432
See application file for complete search history.

(56) References Cited

U.S. PATENT DOCUMENTS

| 3,152,807 A | 10/1964 | Porges et al. | 277/2 |
| 3,503,469 A | 3/1970 | Renz et al. | 184/5 |
| 4,103,907 A * | 8/1978 | Inouye et al. | 277/400 |
| 4,175,755 A | 11/1979 | Geary | 277/137 |
| 5,865,441 A | 2/1999 | Orlowski | 277/364 |
| 6,305,691 B1 * | 10/2001 | Fuse | 277/348 |
| 6,471,214 B1 | 10/2002 | Tornare et al. | 277/399 |
| 2002/0158416 A1 | 10/2002 | Hosanna et al. | 277/358 |
| 2003/0015840 A1 * | 1/2003 | Davis | 277/320 |
| 2003/0184018 A1 * | 10/2003 | Upton et al. | 277/318 |
| 2005/0111770 A1 * | 5/2005 | Ott et al. | 384/418 |
| 2005/0189722 A1 * | 9/2005 | Roddis | 277/400 |

FOREIGN PATENT DOCUMENTS

| DE | 1073259 | 1/1960 |
| DE | 1525927 | 12/1969 |
| DE | 2627195 | 12/1977 |
| DE | 29910079 | 11/1999 |
| DE | 20217585 | 5/2004 |

(Continued)

*Primary Examiner* — Vishal Patel
(74) *Attorney, Agent, or Firm* — Andrew Wilford

(57) ABSTRACT

A shaft extending along and rotatable about an axis and a housing surrounding a portion of the shaft are provided with a seal assembly having an inner ring fixed on and rotatable with the shaft and having a pair of axially oppositely directed outer faces and a pair of outer slide rings axially flanking the inner ring and having inner faces axially sealed on the inner-ring outer faces. The outer rings, the housing, and the inner ring form an annular housing compartment surrounding the shaft. A blocking compartment on the housing is separate from the housing compartment. The inner ring is formed with a radially throughgoing passage having an inner end open on the shaft and an outer end open into the housing compartment. The housing is formed with a bore between the housing compartment and blocking compartment.

10 Claims, 1 Drawing Sheet

FOREIGN PATENT DOCUMENTS

| | | |
|---|---|---|
| DE | 202004012488 | 11/2004 |
| GB | 618347 | 2/1949 |
| GB | 920892 | 3/1963 |
| WO | WO 9325495 A1 * | 12/1993 |

* cited by examiner

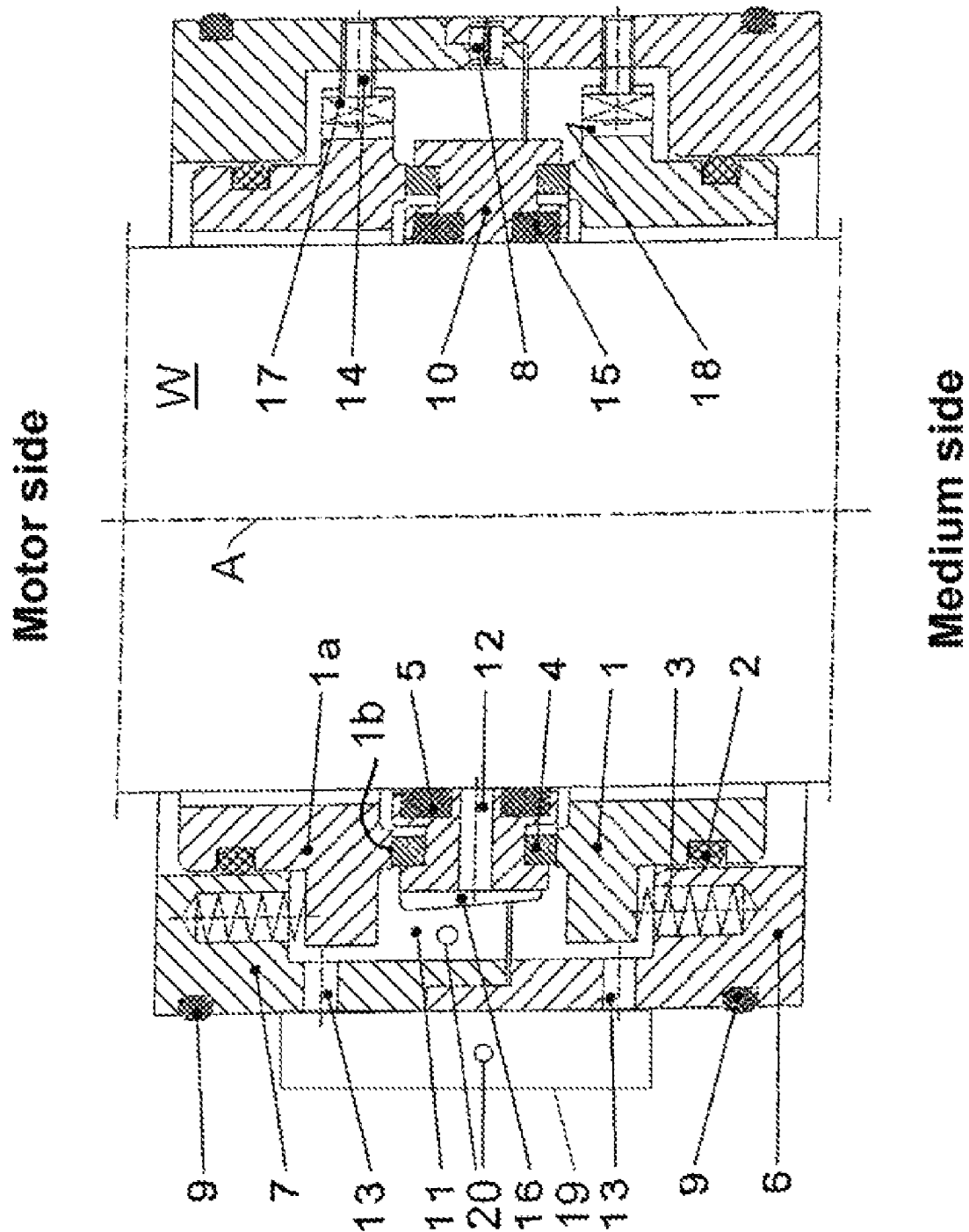

SLIDE RING SEAL

CROSS REFERENCE TO RELATED APPLICATIONS

This application is the US national phase of PCT application PCT/EP2006/007253, filed 24 Jul. 2006, published 8 Feb. 2007 as WO 2007/014666, and claiming the priority of German patent application 102005036338.5 itself filed 29 Jul. 2005, whose entire disclosures are herewith incorporated by reference.

FIELD OF THE INVENTION

The invention relates to a slide-ring seal, especially a slide-ring seal for a housing, comprising an inner or counter-ring that can be rotationally fixed on and sealingly engage a rotatable shaft, and two slide rings between which the counter-ring is coaxially fitted, the rings being provided with slide surfaces in such a manner that the rings can rotate relative to each other in a sealed manner.

BACKGROUND OF THE INVENTION

Such slide-ring seals, that can also be designed as slide-ring seals for a housing, are generally known in the state of the art for sealing a stationary element against a rotating element, customarily a shaft. A typical area of application is for pumps that move a liquid. A slide-ring seal is used e.g. at the position where the shaft is to be sealed relative to the pump housing in order to drive a pump impeller in contact with a liquid to be transported. Accordingly, there is always a side in contact with a transport medium in a slide-ring seal.

Slide-ring seals are customarily designed in such a manner that a so-called counter-ring is rotationally fixed and especially sealed to a rotary shaft. This forms a seal between the shaft and this counter-ring e.g. by at least one annular seal ring fitted to the counter-ring.

Such a counter-ring can be arranged between two so-called slide rings of which one slide ring makes contact with the counter-ring via a slide surface. This slide surface makes a sealed contact of the slide ring on the counter-ring possible and at the same time permits rotation of these elements relative to one another. The selection of the material for these rings must be made accordingly. Usually, silicon carbide is selected as the material for the slide rings and also for the counter-rings, which material has excellent running properties but has the disadvantage of being very brittle and therefore subject to fracture.

Thus, there is usually a leakage problem in such slide-ring seals in the region of a seal ring that should ensure the seal between counter-ring and shaft, or, in the case of the rings consisting of a very brittle and therefore breakable material such as for example silicon carbide.

If for example a seal ring on the counter-ring is defective, liquid can pass the slide-ring seal axially on the shaft and enter e.g. into the motor compartment of a pump, where it results in damage even before such a leak is discovered. Furthermore, even fracture of one of the rings, especially of the counter-ring or of a ring inserted in it and consisting e.g. of silicon carbide can result in a leak in which liquid can penetrate through a slide-ring seal.

Rings, especially if they are manufactured from a very brittle material such as e.g. silicon carbide can break on account of canting or also by in particular localized stress, especially when a motor is started e.g. when the rings run into a stop opposite a housing in order to ensure that the unit consisting of slide rings and surrounding housing rotates jointly relative to the counter-ring. High localized stresses of the ring material and therefore also damage to the material can occur particularly in the region of these rotation blockers.

The invention has the object of providing a new-design slide-ring seal, in particular a slide-ring seal for a housing, that makes it possible to detect a leak even before the fluid can pass from a medium side to the dry side where it can cause damage, and/or to prevent a leak, and which preferably has a lower susceptibility in particular to material breakage.

SUMMARY OF THE INVENTION

According to a first aspect of the invention this problem can be solved in that at least one passage extending in particular radially is provided in the counter-ring, one end of the passage facing the shaft and the other passage end opening in fluid communication with a blocking compartment.

In the case of a leak between counter-ring and shaft, that is, substantially axially, it can either be ensured in such a manner that leak fluid is moved out through the passage in the counter-ring and thus cannot go axially through the slide-ring seal, and/or that leak fluid is prevented from passing through the seal in that a blocking compartment in fluid communication with the passage is placed under pressure and in this manner the leak fluid is forced back by the blocking fluid in the blocking compartment. Thus, in both instances the leak fluid cannot get through, that is e.g. to the fluid being moved by a pump.

The form and in particular the cross section of such a cited passage can be as desired. The passage can be formed in a simple manner as a bore with a round cross section. Several passages are preferably provided e.g. uniformly angularly distributed around the shaft.

In a preferred further development a passage end opening, facing the shaft, of the passage can be arranged in a region between two coaxially successively arranged sleeve/seal rings in the counter-ring.

This design of a slide-ring seal with two or more coaxial, successive sleeve/seal rings in the counter-ring that are spaced from each other and that seal the counter-ring against the shaft, ensures that upon the loss of the sealing function of one of the two sleeve/seal rings the fluid running in an axial direction through the defective seal passes into the open region of at least one passage between two sleeve/seal rings and then through the passage into the blocking compartment or an inner compartment of the slide-ring seal for the housing communicating with the blocking compartment or is forced back by pressurized blocking fluid.

This also provides redundancy in the sealing of the counter-ring relative to a shaft since now at least two sleeve/seal rings are used. If a fatigue phenomenon occurs that can result in a leak in one of the sleeve/seal rings, a seal still is formed because at least one further seal ring is left so that an axial leak is impossible. It can optionally be provided here that more than two sleeve/seal rings are used in the region of the sealing surface between the counter-ring and the shaft.

Each of these individual seal sleeves or can be held e.g. fitted in the slide ring in an annular groove provided for this purpose and extend outward somewhat beyond the inner surface of the counter-ring. Accordingly, if a slide-ring seal with such a counter-ring is placed on the step provided for this purpose on the shaft, the sleeve/seal rings are radially compressed and form a tight, in particular rotationally secure seat of the counter-ring on the shaft. A latch or rotation blocker of the counter-ring can be supported even more by further measures that are familiar to an expert in this art.

A preferred further development can provide that a slide-ring seal of the type in accordance with the invention comprises sensor means with which a leak of the slide-ring seal, in particular in the region of the counter-ring, can be detected, in particular in such a manner that a leak axially through the passage can be detected in the case of a defect of the sleeve on the product side.

The sensor means can be designed in such a manner that it reacts to the fluid that is to be sealed by the slide-ring seal against an environment. For example, in the case of water or many other liquids the sensor can detect electrical conductivity when such a fluid makes contact with the sensor. A sensor can therefore be formed e.g. by electrodes. There is likewise the possibility of arranging other sensors adapted to the particular fluid in such a slide-ring seal. In this manner a leak can be determined very early, especially before the fluid penetrates through the slide-ring seal.

In a preferred further development at least one sensor of the sensor means can be arranged in a blocking compartment and/or in regions communicating with a blocking compartment by means of which the presence of fluid, especially fluid being moved by a pump, can be detected. It can be provided in this instance that the blocking compartment and/or regions communicating with the blocking compartment is/are filled with a blocking fluid, especially with medicinal white mineral oil or a non-oxidizing liquid that evaporates in a residue-free manner.

Thus, if in such an instance a sensor is insensitive to the blocking fluid used but it is nevertheless permeated by leak fluid, detection takes place and service measures can be initiated. It can preferably be provided that the blocking fluid can be replaced.

A counter-ring arranged on a shaft in a fixed and rotation-blocked manner is frequently manufactured completely from a suitable material such as e.g. silicon carbide, so that there is the danger that if the material is damaged e.g. by breakage, this basically has a global effect on the ring in its totality and can thus result in a leak. It is also known that a slide ring can rest via at least one support ring on the counter-ring, in particular when a support ring is fitted in an annular groove open in particular axially on the counter-ring.

By means of this measure the slide ring and the support ring can be optimally coordinated with one another as regards their material in order to ensure the optimal tightness, service life and freedom of rotation, in which case the counter-ring, in which the two support rings (at least one for each support ring) are arranged in a fixed manner, can be manufactured from a different material that has a higher resistance to stresses.

Thus, in this construction in accordance with the invention the counter-ring can be manufactured e.g. from metal and the support rings manufactured e.g. from silicon carbide or some other suitable material with known excellent properties of with regard to rotation and sealing. Such a counter-ring therefore forms a unit with the support rings.

It is important in this construction that a support ring be arranged tightly and also fixedly in the counter-ring. This can take place by measures known to an expert in the art e.g. by an gluing or shrinking in place. Furthermore, the receiving groove into which a support ring is inserted on the counter-ring can be designed slightly larger in its width that the radial thickness of the support ring in order ensure that the latter comes sits without tension in the counter-ring.

This construction has the advantage that given a mechanical stress and a possible fracture of the support ring the entire counter-ring is not completely ruined immediately but rather the latter continues to remain on the shaft in a secure and fixed manner and thus a leak axially continues to be effectively prevented.

Only a leak substantially radially, that is, substantially parallel to the sliding surface between slide ring and support ring can occur in this instance so that any leakage liquid penetrates at first into the slide-ring seal or into the housing or the blocking compartment and an associated region of the slide-ring seal where it continues to be retained, is forced back by blocking fluid and/or is detected by a sensor.

This takes place in an especially advantageous manner if a support ring borders at least partially the blocking compartment and/or regions communicating with the blocking compartment so that in case of a leak the leaking fluid penetrates directly into these regions.

The blocking compartment can be arranged radially at least outside one of the rings, that is, around one of the slide rings or around the counter-ring, and in an especially preferred embodiment the blocking compartment itself can be annular and coaxially surround at least one of these rings, optionally all the rings of the slide-ring seal. This ensures that in the case of a leak between the rings in the sealing region and/or sliding region any penetrating fluid can pass into the blocking compartment and be detected there.

Such a blocking compartment can be realized in an especially simple manner in its design in the case of a so-called glide-ring seal for a housing, in which seal the counter-ring and slide rings are covered, in particular enclosed by a housing coaxially annularly surrounding the rings, in which case the housing rests in a sealing manner with radially inwardly located surfaces on radially outwardly located surfaces of the slide rings. This ensures that the entire arrangement consisting of housing and slide ring and counter-ring forms a tight unit that can be pushed onto a shaft. It is especially advantageous in this case from a manufacturing standpoint if the housing is divided axially into two parts, especially symmetrically, that can therefore be made as two housing halves fitted over the glide rings and then connected to each other. This can take place by retaining pins provided for this purpose.

In a preferred variant of such a slide-ring seal the arrangement of housing and the rings forms an enclosed, annular inner compartment inside this slide-ring seal that can either form the blocking compartment itself or communicate especially via at least one bore in the housing with a blocking compartment arranged e.g. around it.

For the case where the annular inner compartment is not to form the blocking compartment itself, a blocking compartment that is in particular annular can be arranged in a sealing manner on a surface of this housing, which is located radially on the outside e.g. by screwing.

Accordingly, in a slide-ring seal designed in this manner if there is a break of one of the support rings between the slide ring and the counter-ring or if there is a leak in the region of a seal/sleeve ring between the counter-ring and the shaft the fluid will first pass through a support ring or through a passage in accordance with the invention into the inner compartment of the formed slide-ring seal of the housing and either be directly detected there in the inner compartment or the fluid can pass through passages extending from the inner compartment through the outer housing wall into a blocking compartment located outside it.

For a better extraction of heat, especially in the region of the slide surfaces, the slide-ring seal can comprise as a supplement a transport device for fluid, in particular by fins/blades (16) that are arranged in a radially projecting manner and are in particular axially aligned on the counter-ring (10)

and surrounded by blocking fluid. The improved thermal transport on the glide surfaces can bring about lesser wear.

Furthermore, the counter-ring seal forms a tight unit that is closed within itself so that at least in the case of a leak the entire tightness continues to be retained but the leak can be detected so that the apparatus in which such a glide ring seal is being used can be serviced.

Thus, all the above-described embodiments, in particular in an especially preferred combination of all these embodiments but also even when optionally used alone, achieve the considerable advantage that in addition to redundancy on account of the doubling of the relevant parts at the same time a reliable detection of all possible and of the most probable leakages can also take place.

It can be provided in all the previously cited alternatives or embodiments to be combined with each other in a cumulative manner that the slide rings are pressed against the counter-ring or against the support rings arranged in it on account of a spring acting between the housing and the slide ring, in particular in such a manner that axial play remains between the housing and the rings. To this end e.g. a spring can be arranged between a radially inwardly projecting region of a housing and a radially outwardly projecting region on a slide ring so that the spring is arranged with its axis substantially parallel to the axis of a shaft. Axial shaft movements, in particular when starting an electric motor, can thus be detected.

In addition, a slide-ring seal can cant in its mounts, especially between the housing and slide ring, at an angle to the axis of rotation, as a result of which high localized stresses can occasionally be produced in the partially brittle material of the slide rings in known provided rotation blockers.

Thus, it is known e.g. in the state of the art that rotation blocking can be achieved in that axially aligned pins are arranged on a housing and cooperate with a stop on a slide ring in order to prevent rotation of these elements relative to one another. However, only linear contact and in the case of a canting even only a point contact can occur between the surface of such an axially aligned pin and a stop on the slide ring, so that the stresses are particularly high here, especially when starting a motor, and accordingly can result in damage.

In order to ensure greater reliability here it can be provided in accordance with a second aspect for solving the problem in a design of a slide-ring seal in accordance with the invention and of the previously cited generic type in which the counter-ring and the slide rings are covered, especially covered over, by a housing arranged annularly and coaxially to the rings, that the rotation blocker comprises at least one pin on which a stop element with a stop surface is rotatably arranged, which stop surface cooperates with an abutment. Such a slide-ring seal can also be combined as regards its features with all previously cited embodiments.

This brings it about in especially advantageous manner that on the one hand the abutment is localized in any case and that on the other hand as a consequence of the freedom of rotation of the stop element on a pin its stop surface is always automatically aligned with the abutment on contact so that an surface contact is produced between the stop and the abutment. This results in lesser stressing and therefore in less damage. It can be provided here that the freedom of rotation is possible only in a certain angular range. Rotation is preferably always less than 360° and is limited e.g. by the surrounding structural elements.

It can be provided in a first embodiment that the pin is fixed on the housing in particular perpendicular to the axial direction of the slide-ring seal and that the abutment is provided on a slide ring, in particular on a radially outwardly facing projection of the slide ring, which projection comprises an abutment surface. As a consequence of this construction the pin is aligned e.g. perpendicular to the axial direction of the slide-ring seal and the stop element can rotate with its stop surface about the axial direction of the pin, and it is ensured that even in the case of canting at an angle to the axis of rotation of the slide-ring seal an surface contact is achieved.

In a kinematic reversal of the above-cited embodiment it can also be alternatively provided that the pin is provided on a slide ring, in particular perpendicular to the axial direction of the slide-ring seal, and that an abutment is provided on the housing, in particular on a radially inwardly facing projection comprising an abutment surface.

It is a significant viewpoint for the advantageous design that one of the two stops, that is, either the stop surface of the previously cited stop element or even the stop surface of the previously cited abutment can move at least within limits relative to the structural component to which the stop is fastened in order to be able to align itself relative to the particular other stop in this manner upon a possible canting. This is achieved as previously stated preferably by means of a rotation about the pin axis.

In an especially advantageous, constructively simple embodiment a pin can be designed to this end e.g. as a pin with external screwthread and a stop as a polygonal nut with internal screwthread. Accordingly, the polygonal nut can be screwed onto the pin, which polygonal nut has several surfaces on its outer side that correspond to the number of edges, which surfaces can be aligned at least in one dimension about the pin axis in accordance with the possibility of the rotation of the polygonal nut in order to fit with the respective other stop in this manner.

In an embodiment of the abutment in the counter-ring the counter-ring can comprise e.g. a radially projecting collar comprising a slot or an axial groove and the width of the slot or groove is dimensioned in such a manner that the stop element can fit in it. As a result thereof and also by means of an appropriately small spacing of a rotatable stop element an angular limitation of the freedom of rotation can be achieved.

BRIEF DESCRIPTION OF THE DRAWING

An illustrated embodiment of the invention is presented in the sole FIGURE of the drawing and discussed in the following.

SPECIFIC DESCRIPTION

The drawing shows a cross-section of a slide-ring seal for a housing where a seal is fitted on a shaft W that can here rotate about an axis A. The slide-ring seal is pressed against the surface of the shaft W by an inner ring or counter-ring 10 in such a manner that the counter-ring 10 is rotationally fixed to and sealed against this shaft W. The seal between the counter-ring 10 and the shaft W is achieved by means of two spaced and coaxial seal rings 5 made e.g. of an elastomeric material.

The counter-ring 10 is fitted between two outer slide rings 1 and 1*a* that bear on the counter-ring 10 via support rings 4 with their slide faces 1*b*, which support rings 4 are fitted e.g. shrunk, into coaxially open grooves of the counter-ring 10.

These grooves are each slightly larger than the radial thickness of the respective support ring 4, as can be recognized here, in order ensure that these rings 4 can be fitted into the grooves without stretching.

It can be furthermore recognized in this embodiment that the slide rings 1 and 1*a* as well as the counter-ring 10 are enclosed by a coaxial housing consisting of two housing halves 6 and 7 forming an inner compartment 11.

A respective spring 3 is braced between a radially outwardly projecting element on each of the slide rings 1 and 1a and a respective radially inwardly projecting element (e.g. collars running around the shaft) on the housing halves 6 and 7, by means of which each slide ring 1 or 1a is biased axially inward toward the counter-ring 10 or the respective support ring 4 in order to ensure a tight seat at the respective slide surface 1b. Here, the two housing halves 6 and 7, which can be secured to each other by retaining pins 8, are each sealed to the respective slide ring 1 or 1a via a respective O-ring seal 2 fitted in a groove in an outer surface of the respective slide ring.

The housing slide-ring seal shown in FIG. 1 has the particular advantage on the one hand of redundancy on account of there being two seal rings 5 and of the provision of respective support rings 4 on the counter-ring 10.

In this case, the counter-ring 10 can for example be made from metal and the support rings 4 can be made of silicon carbide or some other material capable of sliding that works especially well with the material of the slide rings 1 and 1a, which can also be silicon carbide.

In case of damage, failure of one of the ring seals 5 will not inevitably lead to failure of the other ring seal 5, that is only one will fail. Accordingly because the other seal is still undamaged no liquid can move axially along the shaft under counter-ring 10.

In order to make it possible to detect such a leak here, the counter-ring 10 is formed with a passage 12 that here extends radially and empties on the one hand into the region between the sleeves and on the other hand into an inner compartment 11. Liquid that accordingly gets past the counter-ring on account of a leak in a seal ring 5 is therefore conducted through the passage 12 into the inner compartment 11, in which a sensor 20 is already optionally arranged in order to detect this liquid. Also, the inner compartment 11 can be pressurized with a blocking fluid and thus force the leak fluid back.

Furthermore, it also possible that, as indicated here, the two housing halves 6 and 7 are formed with radially throughgoing bores 13 via which the inner compartment 11 can communicate with a further ring element that is tightly secured via O-rings 9 to the outer surface of the housing 6, 7 to form a blocking compartment 19 in the sense of the above-described invention. Thus, the sensor such as shown at 20 for detecting leakage can also be housed in this blocking compartment 19, and all the inner compartments, that is the blocking compartment 19, the communicating passages 13, the inner compartment 11 and the passage 12 are filled with a blocking liquid different from the medium that the seal is against. This can be e.g. oil or even pure water.

In another instance of leakage e.g. a support ring 4 can break due to its brittleness e.g. when formed from silicon carbide. If this should be the case, the fracture of such a ring 4 will not also extend to the other ring 4 because of the separation of material and also not to the counter-ring 10 since all these structural components are independent of each other even though they are connected together.

Accordingly, in the case of a break or a leak in one of these rings 4 no leakage liquid can likewise travel axially through the slide-ring seal but instead leak liquid will pass through the damaged support ring 4 substantially radially back into the inner compartment 11 and be immediately detected there, or, after having been conducted farther by the passages 13, inside the blocking compartment 19 not shown here.

This ensures that in the case of the most likely occurring leakages the slide-ring seal continues to remain tight as a unit on account of the increased redundancy and on the other hand detection of the leak can also take place before damage to the apparatus occurs in which the glide ring seal is being used.

Radially projecting and in particular substantially axially extending fins 16 can be formed on the counter-ring 10 on its outer side facing into the inner compartment 11. These fins 16 form scoops on the counter-ring 10 and put the fluid in the inner compartment 11 or the blocking compartment 19 into motion. This can achieve a more rapid transfer of heat, particularly in the region of the slide surfaces 1b, and thus lower wear.

Furthermore, FIG. 1 also shows a design of a rotational coupling in the right region that is arranged here for realization in each housing half 6 and 7 in order to prevent that either of the two slide rings 1 can rotate relative to the housing. Thus, the entire unit consisting of slide rings and housing will rotate relative to the counter-ring when this rotation blocker is used.

In order to achieve this, threaded pins 14 are arranged radially and therewith substantially perpendicular to the axis of rotation A inside the housing so that their ends project into the inner compartment 11. A polygonal, here square, nut 17 is screwed onto the inner end of each threaded pin 14. This nut is axially fixed on the respective pin 14 by its screwthread but can rotate about the axis of pin 14 at least limited angularly and cooperates with an abutment 18 mounted on a radially outwardly directed projection on the respective slide ring.

This ensures that if the ring arrangement should cant relative to the axis of rotation A outside of the view plane considered here, the two stop regions, that is, the surface of a nut 17 and the particular abutment 18 continue to rest against each other in surface contact and thus load peaks are avoided.

Accordingly, all measures of the invention suggested here contribute to an increased safety, longer service life and to better maintenance.

The invention claimed is:

1. In combination with a shaft extending along and rotatable about an axis and a housing surrounding a portion of the shaft, a seal assembly comprising:
   an inner ring fixed on and rotatable with the shaft and having a pair of axially oppositely directed outer faces each formed with a respective radially outwardly open groove;
   a pair of outer slide rings axially flanking the inner ring and having inner faces axially sealed on the inner-ring outer faces;
   respective support rings in the grooves of the inner-ring outer faces and engaging the outer-ring inner faces, the outer rings, the housing, the support rings, and the inner ring forming an annular housing compartment surrounding the shaft;
   a liquid in the compartment;
   radially projecting vanes in the housing compartment on the inner ring, whereby as the inner ring rotates in the housing compartment its vanes move the liquid therein;
   a respective groove having axially spaced flanks and open radially outwardly into the housing compartment on each of the outer rings;
   respective radially inwardly projecting elements fixed in the housing and each having a threaded inner end in the compartment aligned radially with a respective one of the grooves; and respective nuts threaded and rotatable on the inner ends, received in the respective grooves of the outer rings, and angularly engageable with the flanks of the respective grooves of the outer rings for preventing free radial rotation of the outer rings in the housing.

2. The seal assembly defined in claim 1, further comprising:

a blocking compartment on the housing separate from the housing compartment, the inner ring being formed with a radially throughgoing passage having an inner end open on the shaft and an outer end open into the housing compartment, the housing being formed with a bore between the housing compartment and blocking compartment.

3. The seal assembly defined in claim 2, further comprising two annular shaft seals axially spaced from each other and each radially inwardly engaging the shaft and radially outwardly engaging the inner ring, the inner passage end opening radially inward on the inner ring between the annular shaft seals.

4. The seal assembly defined in claim 3, further comprising:

sensor means for detecting liquid in one of the compartments.

5. The seal assembly defined in claim 4 wherein the sensor means is in the housing compartment.

6. The seal assembly defined in claim 4 wherein the sensor is in the blocking compartment.

7. The seal assembly defined in claim 2, further comprising a liquid filling the blocking compartment that is different from a liquid lubricating the shaft.

8. The seal assembly defined in claim 7 wherein the liquid in the blocking compartment can be exchanged.

9. The seal assembly defined in claim 1 wherein the grooves of the inner rings have a radial width greater than a radial thickness of the respective support rings so that the support rings are seated with radial play in the respective grooves.

10. The seal assembly defined in claim 1 wherein the support rings are of silicon carbide.

* * * * *